United States Patent
Lundvik et al.

(10) Patent No.: US 8,032,455 B2
(45) Date of Patent: Oct. 4, 2011

(54) FLOORPLANNING

(75) Inventors: Erik Lundvik, Stockholm (SE); Jon Letting, Oslo (NO); Per Moen, Oslo (NO); Vegard Olsen, Knapsted (NO)

(73) Assignee: Banqsoft AB, Stockholm (SE)

( * ) Notice: Subject to any disclaimer, the term of this patent is extended or adjusted under 35 U.S.C. 154(b) by 1558 days.

(21) Appl. No.: 11/220,380

(22) Filed: Sep. 6, 2005

(65) Prior Publication Data

US 2007/0055624 A1 Mar. 8, 2007

(51) Int. Cl.
*G06Q 40/00* (2006.01)
(52) U.S. Cl. .......................................................... 705/40
(58) Field of Classification Search ................ 705/40, 705/35, 37
See application file for complete search history.

(56) References Cited

U.S. PATENT DOCUMENTS

| | | | | |
|---|---|---|---|---|
| 5,732,400 A | * | 3/1998 | Mandler et al. | 705/26 |
| 5,794,207 A | * | 8/1998 | Walker et al. | 705/1 |
| 6,041,310 A | * | 3/2000 | Green et al. | 705/27 |
| 6,085,168 A | * | 7/2000 | Mori et al. | 705/17 |
| 6,151,588 A | * | 11/2000 | Tozzoli et al. | 705/37 |
| 2005/0010522 A1 | * | 1/2005 | Kusu | 705/37 |

* cited by examiner

*Primary Examiner* — Calvin L Hewitt, II
*Assistant Examiner* — Zeshan Qayyum
(74) *Attorney, Agent, or Firm* — Roberts Mlotkowski Safran & Cole, P.C.

(57) ABSTRACT

The invention relates to a method and a system providing floor-planning of consignment financing involving transaction interfaces between a provider of goods (16), financing provider (14), dealer of the goods (12), and a banking provider (44) through a network for at least one of a telecommunication and data communication. Hence, providing a web interface which keeps track on financial transactions on a real time basis day by day to involved parties (12, 14, 16) in the transactions taken place.

6 Claims, 3 Drawing Sheets

FLOORPLANNING

TECHNICAL FIELD

The present invention pertains to a method and a system providing floor-planning of consignment financing involving transaction interfaces between a provider of goods, financing provider, dealer of the goods, and a banking provider through a network for at least one of a telecommunication and data communication.

BACKGROUND

Currently there is a need for a quick resolution of the financial status regarding the trade of goods, i.e., parties taking financial obligations when trading goods do need to be updated of their accounts in a specific trade on a daily basis. It is not sufficient to rely on posting of invoices, telephone calls to settle transactions and the like transactions when making business. A delay in these transactions causes interests costs that are not feasible in the present society of fast electronic financial transactions.

Especially, there is a need for an automatic method and system handling goods that are mass produced and have a relatively short lifetime as being modern for short periods and highly susceptive to new designs and evolving environmental requirements as well as personal security issues such as which are imposed on newly manufactured vehicles and the logistics of related spare parts. Not to forget used cars and problems related to their actual or present "blue book" value. Dealers of such vehicles often rely on financial providers, which both take a high financial risk, which should be settled as soon as possible, i.e., on the day when the vehicle is subject of a transaction and not a month later as is usual for instance by a 30 day invoicing period.

Moreover, there are other goods then vehicles which are susceptible to like problems as vehicle merchandising.

SUMMARY OF THE DESCRIBED INVENTION

The present invention aims to solve problems related to delayed updating of accounts due to financial transactions when taking financial responsibilities no matter if it regards deliverers of goods, financial providers, customers and banking providers. Especially, the present invention provides solutions to financial consignment of goods, whereby trading of vehicles will be used as an example to describe the present invention not withstanding other types of goods.

Hence, the present invention sets forth a method providing floor-planning of consignment financing involving transaction interfaces between a provider of goods, financing provider, dealer of the goods, and a banking provider through a network for at least one of a telecommunication and data communication. The present invention thus comprises:

the dealer ordering the goods by utilizing the communication;

the provider of goods delivering the goods through transportation facilities to the dealer;

a consignment web interface at the financing provider interfacing the provider of goods, dealer, and banking provider;

the provider of goods invoicing the financing provider through the web interface;

the financing provider confirming delivery of the goods through a message to the dealer through the web interface;

the dealer visiting the web interface and registering a purchase of the goods;

the financing provider invoicing the dealer by a message through the web interface;

the financing provider having a settlement account for the dealer connected to the web interface;

netting the settlement account upon invoicing the dealer, and settling the account on a daily basis by debiting or crediting a dealer or own account at a banking provider through the communication, thus settling financial consignment on a real time basis considering the day of purchase of the goods.

In one embodiment of the present invention the web interface comprises a floor-planning account, purchase financing through dealer, provisions and subsidy connected to the settlement account for netting.

Another embodiment comprises that the floor-planning comprises advertisement programs, and campaigns in the settlement of the netting account.

A further embodiment comprises that the floor-planning allows deliverers to accomplish the main part of their efforts by moving one object from one site to another, to an external approved partner in order to be complemented.

Yet a further embodiment comprises that the floor-planning conveys handling of used objects such as loan a vehicle in a garage and release a vehicle from the existing stock.

A still further embodiment comprises that the deliverer receives reports through the web interface such as objects in stock, bookkeeping, audition information, and settlement agreements.

Moreover the present invention sets forth a system providing floor-planning of consignment financing involving transaction interfaces between a provider of goods, financing provider, dealer of the goods, and a banking provider through a network for at least one of a telecommunication and data communication. The system thus comprises:

electronic ordering of the goods by the dealer by utilizing the communication;

transportation facilities from the provider of goods delivering the goods to the dealer;

a consignment web interface at the financing provider interfacing the provider of goods, dealer, and banking provider;

electronic invoicing by the provider of goods to the financing provider through the web interface;

electronic confirmation from the financing provider of delivery of the goods through a message to the dealer through the web interface;

the web interface visited by the dealer and registering a purchase of the goods;

electronic invoice of the dealer by the financing provider by a message through the web interface;

a settlement account hold by the financing provider for the dealer connected to the web interface;

electronic netting of the settlement account upon invoicing the dealer, and settling the account on a daily basis by debiting or crediting a dealer or own account at a banking provider through the communication, thus settling financial consignment on a real time basis considering the day of purchase of the goods.

Other embodiments of the system of the present invention correspond to the above method in accordance with the attached dependent system claims.

BRIEF DESCRIPTION OF THE DRAWINGS

Henceforth, the present invention is described with reference to the accompanying drawings for a better understanding of its embodiments and given examples, wherein.

DETAILED DESCRIPTION OF PREFERRED EMBODIMENTS

Figure 1:
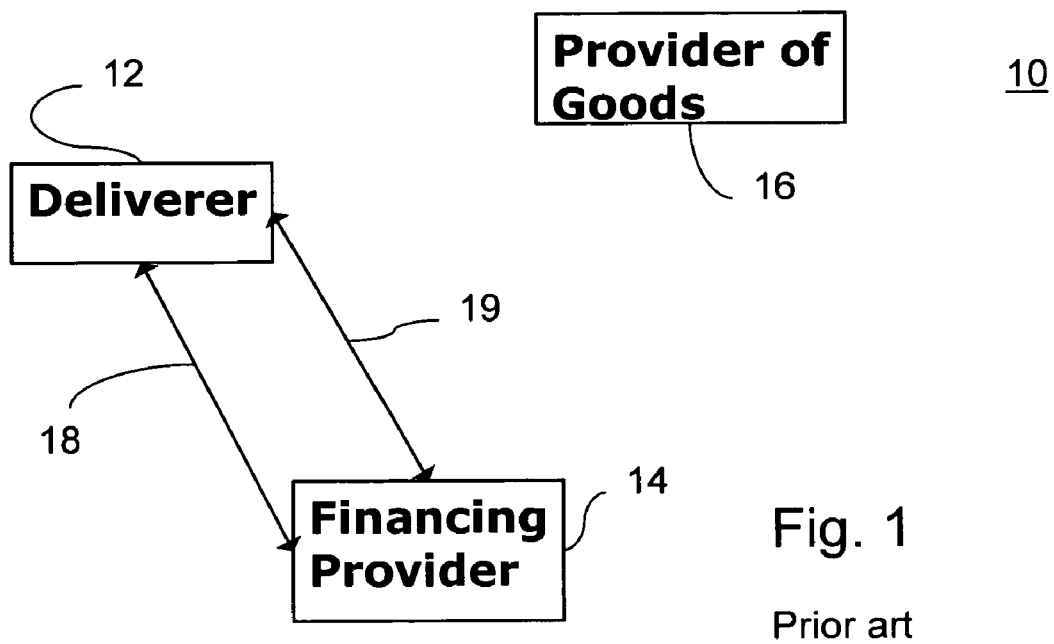
FIG. 1 schematically illustrates a prior art financing of purchasing new or used objects/goods as sale and lease back.

The present invention introduces floor-planning as a smarter answer for consignment financing, thus the dealer view could be how to gain from this concept. The dealer view of the present invention provides full interactive control of the consignment financing, offering multiple operational benefits such as increased credit volume, reduced staff requirement, and a dealer is able to handle a large part of a registration process to for instance vehicle trade, as will be used as an example throughout the present description without limiting the present invention to such goods. A dealer will be provided full on-line control of asset (vehicle) status, even when vehicles are physically located in the dealer's warehouse. Also provided by the present invention is full control of cash flows, and minimizing the number of transactions via external banks, as well ass individual price setting In a functional overview, the present invention provides a broad range of flexible automated functions. This involves administration of consignment financing, according to pre-scribed legislation and accepted trade practice, and semi-automated inventory administration. Each dealer can supervise its own inventory control and administration. Also, it introduces access authorization options that enable a parent company to determine the degree of web access necessary. It thus permits specific dealers at different locations to access the web interface in accordance with the present invention.

All vehicles in a fleet can be linked to finance programs or campaigns. Pricing and other criteria's can be defined for released programs or campaigns. Furthermore, VAT payment parameters can be included on fees charged.

Hence, the present invention provides a user-friendly web interface giving vehicle dealers full real-time control over vehicle inventories. A dealer is able to activate its own inventory administration and report generation via the present invention web-interface, and initiate a buy-out from consignment stock, triggering a system-generated invoice delivered by e-mail, and move a vehicle from one physical location to another.

The dealer is also provided the possibility to increase/decrease the loan amount by registering used vehicles as collateral, and generate reports that comply fully with administration, accounting and auditing requirements.

Programs, price strategies and campaigns will be accounted for in accordance with the present invention. A program defines price strategies and other conditions, thus a program can be configured for all dealers in accordance with the present invention. Thereby, a specific dealer or a group of vehicle dealers are able to design their own program for sale, and this configured even for specific types of vehicles.

A campaign is a program limited to a specific period of time incorporating for instance subsidy agreements, which can be a subject of no limitations. Hence, the present invention offers a complete solution for portfolio administration with a broad range of price strategies available. Charges can be fixed or relative according to a charge index. All charges are calculated for individual vehicles.

Regarding consignment financing of new vehicles in accordance with the present invention, the finance company/provider receives an electronic file from the importer of vehicles, with data on new vehicles for consignment. When a new vehicle is registered for consignment, an e-mail is sent to the dealer. When the system of the present invention scans the file from the importer, the vehicle is automatically linked with a program or campaign, according to program priority.

The present invention further involves the trade of used vehicles, thus vehicles are evaluated or interfaced with "blue books" or equivalents. An option of evaluation is to define a maximum financed amount as x % of the blue book value.

Credit limits for vehicles are available for three levels of accounts for new and for used, as for the vehicle dealer or group of dealers. Limit controls can be applied at all levels. Other forms of financing, leasing or loan will be added to a total utilized credit. Thereby, it is appreciated that an over-draft should not be available for used vehicles.

The system requirements for utilizing the present invention web-interface regards Windows 2000/XP®, MS Explorer 5.5® or higher, or Streamserve® output management system.

FIG. 1 schematically illustrates a prior art financing 10 of purchasing new or used objects/goods as sale and lease back. The manufacture or provider of the goods 16 (vehicles) is cut off of the trade delivering vehicles to the dealer 12, and after being paid by the financial provider 14. Therefore, the financial transactions between dealer 12 and financial provider 14 commences through leasing contracting 18 and invoicing/payment 19 as presently common. The financial provider thus buys new or used vehicles/objects/goods from the deliverer named as sale and lease back.

Figure 2:
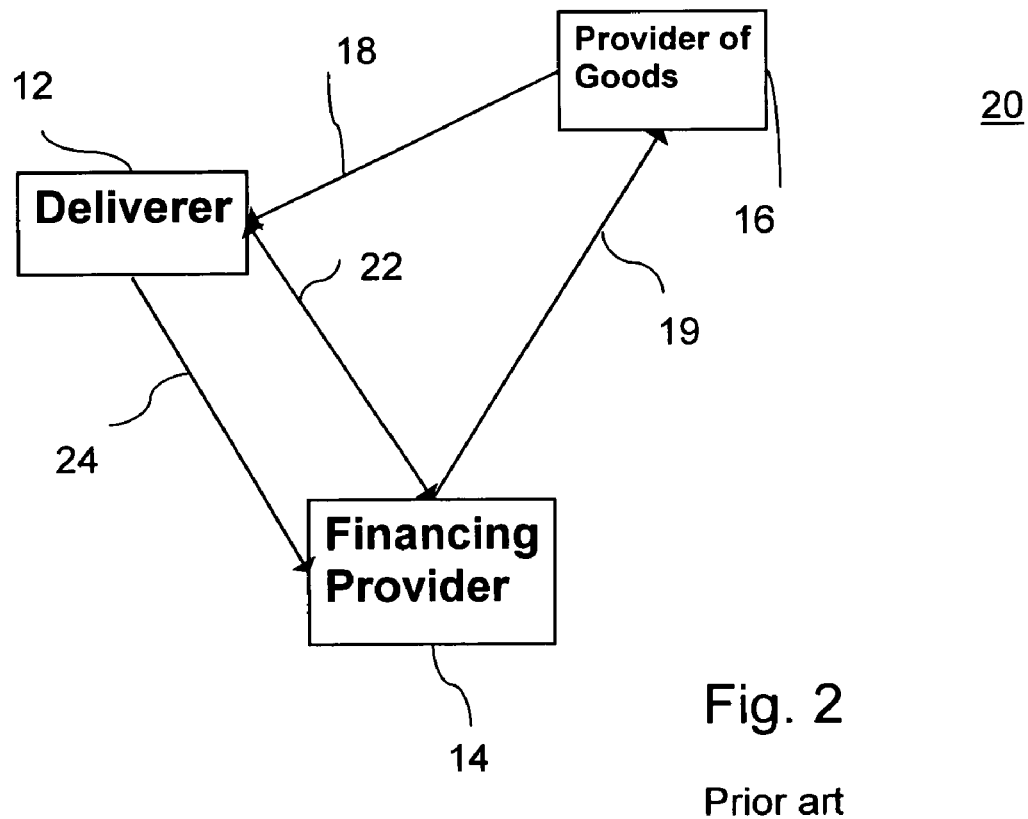
FIG. 2 schematically illustrates a prior art factoring like financing with up-front and later payment.

In FIG. 2 it is schematically illustrated how a prior art factoring like financing with up-front and later payment is commenced. The provider/manufacturer of goods 16 invoices the deliverer 12 of ordered vehicles, and sends a copy 22 to the financial provider 14. The financial provider pays 19 the invoice, and the financial provider 14 and dealer 12 negotiate 24 about re-payment according to their agreement. This is similar to a factoring financing where the invoice is paid up-front by the financial provider 14, and where the deliverer 12 pays at a later occasion.

Figure 3:
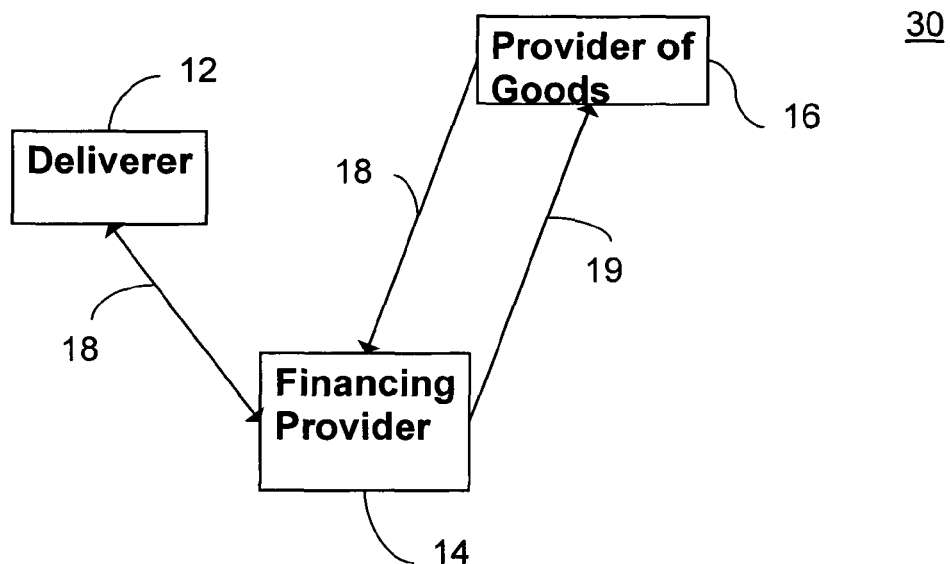
FIG. 3 schematically illustrates prior art consignment, demo leasing, demo mortgage payment, or rental fleet financing.

FIG. 3 schematically illustrates prior art consignment, demo leasing, demo mortgage payment, or rental fleet financing. Thus, the provider of goods 16 invoices 18 the financial provider 14, and the financial provider 14 pays 19 the provider of goods 16. Furthermore, the financial provider 14 and the dealer 12 settle their deals through leasing, mortgage payment, consignment, or a rental fleet contract 18. This is considered a short term financing; to buy the goods from the provider of goods 16, and finance it for the deliverer 12 according to one or several options such as demo leasing, demo mortgage payment, consignment, or rental fleet financing.

Figure 4:
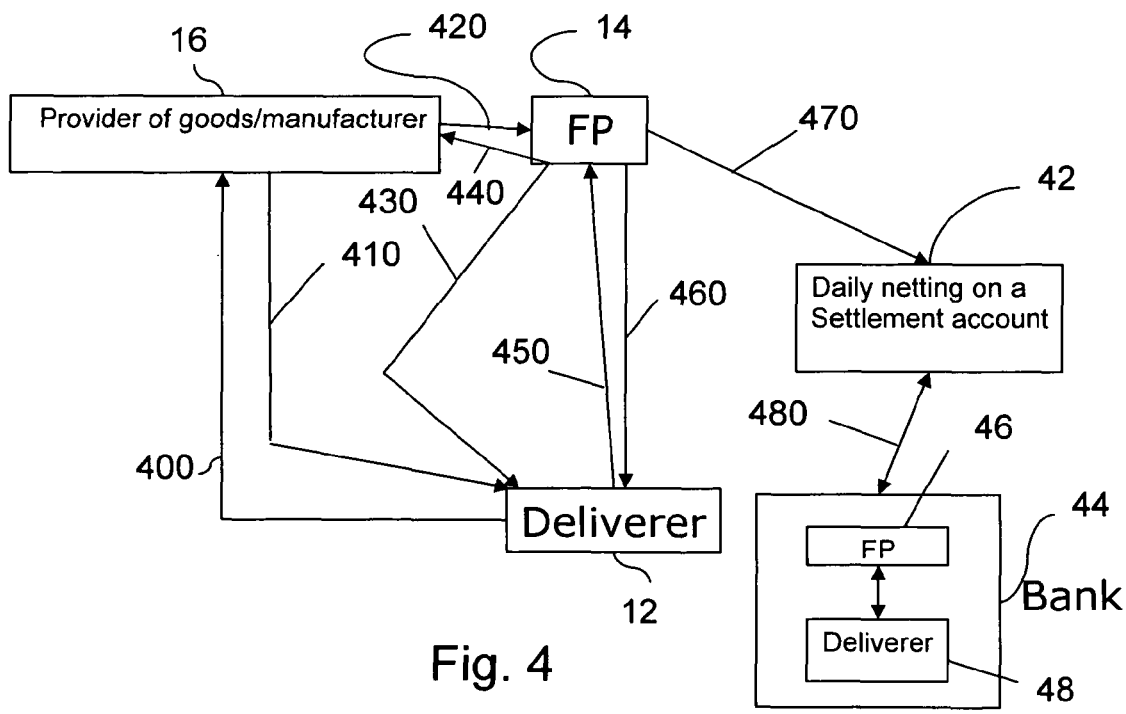
FIG. 4 schematically illustrates on a day to day basis real time consignment according to the present invention.

FIG. 4 schematically illustrates on a day to day basis real time consignment according to the present invention. According to the present invention all parties deliverers 12, providers of goods 16, and banking facility/provider 44 are connected to a web interface hold by the financial provider 14 through at least one of data and telecommunications. The deliverer of goods 12 orders the goods 400 from a provider/manufacturer 16, which is delivered 410 by suitable transportations. Hence, the provider of goods 16 invoices 420 and registers the order at the financial providers 14 web-site through for instance an e-mail, thus assuring electronic confirming of the dealers 12 order. Moreover the financial provider confirms 430 the order through the web interface via for instance e-mail to the dealer 12.

Simultaneously, the financial provider 14 pays 440 the invoice for the specific order of goods to the provider/manufacturer of the goods 16. When the deliverer of the goods 12 sells 450 an item of the goods (one vehicle) to a customer, the financial provider 14 via the web site, invoices 460 the dealer 12 for instance through e-mail.

All transactions between involved parties 12, 14, 16 are settled on a daily real time basis 470 through a settlement account 42 settling all the transactions made through the web interface regarding each and every connected dealer 12 at a banking provider 44. Hence, every transaction is automatically settled every day regarding the accounts 46, 48 hold by the financial provider 14 and dealer 12, respectively. In this manner all parties are able to keep track on there affairs on a current basis minimizing their interest rates.

Figure 5:
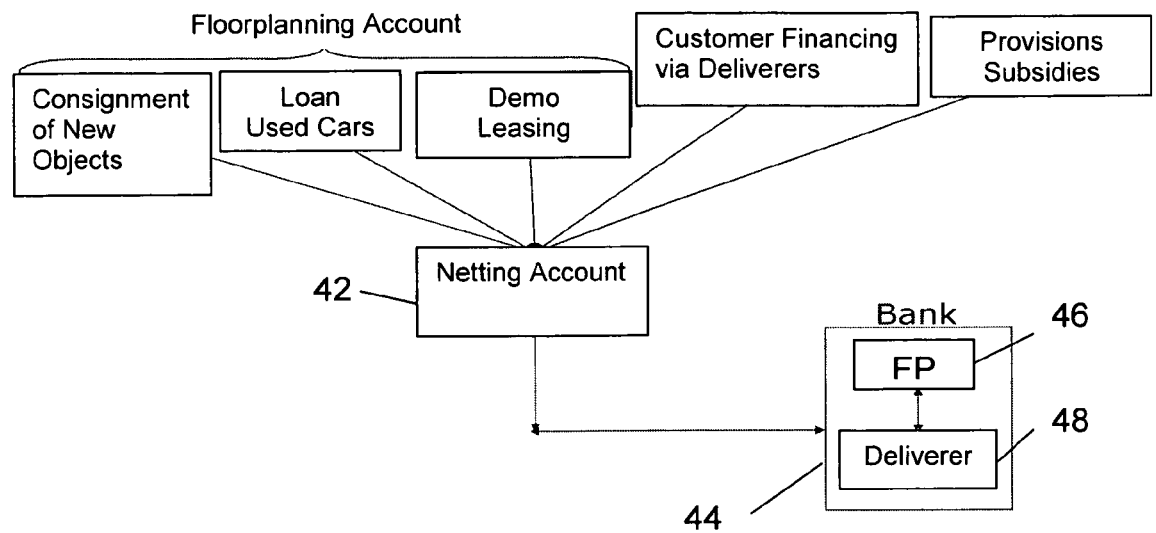
FIG. 5 schematically illustrates a netting account for floor-planning in accordance with the present invention.

FIG. 5 schematically illustrates a netting account 42 for floor-planning in accordance with the present invention. Thereby, all transactions made by a dealer 12, financial provider 14 are up to date concerning, for example, floor-planning (vehicles) accounts. Loan for used cars, demo leasing, customer financing via a deliverer 12, and involved provisions and subsidies for each dealer 12 are thus monitored and registered by the web interface of the present invention.

Floor-planning is financing of a dealers 12 stock of goods such as objects in store and display hall, objects for demonstration, used goods in stock and display hall, fleet for rental, and spare parts in stock. Programs and campaigns offers the possibilities to expose specific objects in a display hall. The present invention web interface automatically finds a suitable program or campaign providing the best opportunities for the deliverer 12. Programs of advertisement and campaigns define pricing parameters and other terms, subside agreements with one or multiple partners, and possibilities to arrange different types of fees. A subside program could include different pricing parameters, interests, consignment fees, and settlement fees.

The floor-planning system of the present invention allows deliverers 12 to accomplish the main part of their efforts for instance move one object from one site to another, to an external approved partner in order to be complemented. Moreover, a possibility is handling of used objects, for example, loan a vehicle in a garage and release a vehicle from the stock. The deliverer 12 can receive reports through the web interface of the present invention such as objects in stock, bookkeeping, audition information, and settlement agreements. Day to day transactions are manifold between the financial provider 14 and the dealer 12 such as payment to the deliverer 12, new contracts for financing, provisions etc., payment to the financial provider 14, such as buying an object in consignment, consignment fees, subsides and the like.

The attached set of claims determines other feasible embodiments for a person skilled in the present art.

The invention claimed is:

1. A method providing floor-planning of consignment financing involving transaction interfaces between a provider of goods, financing provider, dealer of said goods, and a banking provider through a network for at least one of a telecommunication and data communication, comprising:
    said dealer ordering said goods by consignment financing by utilizing said communication;
    said provider of goods delivering said goods through transportation facilities to said dealer;
    a consignment web interface at said financing provider interfacing said provider of goods, dealer, and banking provider;
    said provider of goods invoicing said financing provider through said web interface;
    said financing provider confirming delivery of said goods based on a consignment agreement through a message to said dealer through said web interface;
    said dealer visiting said web interface and registering a purchase of said goods based on said consignment agreement;
    said financing provider invoicing said dealer by a message through said web interface;
    said financing provider having a settlement account for said dealer connected to said web interface;
    netting said settlement account upon invoicing said dealer, and settling said account on a daily basis by debiting or crediting a dealer or own account at a banking provider through said communication, thus settling financial consignment on a real time basis considering the day of purchase of said goods.

2. A method according to claim 1, wherein said web interface comprises a floor-planning account, purchase financing through dealer, provisions and subsidy connected to said settlement account for netting.

3. A method according to claim 1, wherein said floor-planning comprises advertisement programs, and campaigns in the settlement of said netting account.

4. A method according to claim 1, wherein with said floor-planning dealers accomplish the main part of their efforts by moving one object from one site to another, to an external approved partner in order to be complemented.

5. A method according to claim 1, wherein said floor-planning conveys handling of used objects, including loaning a vehicle in a garage and releasing a vehicle from the existing stock.

6. A method according to claim 1, wherein said dealer receives reports through said web interface objects in stock, bookkeeping, audition information, and settlement agreements.

* * * * *